(12) United States Patent
Lee

(10) Patent No.: US 10,877,507 B2
(45) Date of Patent: Dec. 29, 2020

(54) INSTALLATION STRUCTURE OF PEDAL STROKE SENSOR

(71) Applicant: MANDO CORPORATION, Gyeonggi-do (KR)

(72) Inventor: Hye Won Lee, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 162 days.

(21) Appl. No.: 16/163,639

(22) Filed: Oct. 18, 2018

(65) Prior Publication Data
US 2019/0121385 A1 Apr. 25, 2019

(30) Foreign Application Priority Data
Oct. 19, 2017 (KR) .................. 10-2017-0135571

(51) Int. Cl.
*G05G 1/38* (2008.04)
*B60T 7/04* (2006.01)
(Continued)

(52) U.S. Cl.
CPC .............. *G05G 1/38* (2013.01); *B60T 7/042* (2013.01); *B60T 7/06* (2013.01); *B60T 8/368* (2013.01); *B60T 11/18* (2013.01); *B60T 17/223* (2013.01)

(58) Field of Classification Search
CPC ... G05G 1/38; B60T 7/06; B60T 8/368; B60T 7/042; B60T 11/18; B60T 17/223
See application file for complete search history.

(56) References Cited

U.S. PATENT DOCUMENTS 4,462,642 A * 7/1984 Leiber .................. B60T 7/042
303/113.4
7,893,688 B2 * 2/2011 Kawashima .......... G01D 5/145
324/207.23
(Continued)

FOREIGN PATENT DOCUMENTS

KR  10-2011-0053777   5/2011
KR  10-2013-0037720   4/2013
(Continued)

OTHER PUBLICATIONS

Office Action dated Nov. 26, 2018 for Korean Patent Application No. 10-2017-0135571 and its English machine translation by Google Translate.

*Primary Examiner* — Freddie Kirkland, III
(74) *Attorney, Agent, or Firm* — Ladas & Parry, LLP

(57) ABSTRACT

An installation structure of a pedal stroke sensor of an integrated dynamic brake (IDB) system is disclosed. The IDB system includes a hydraulic block, a hydraulic pressure generator, and an electronic control unit (ECU). The hydraulic block includes not only a master cylinder connected to a brake pedal but also a plurality of passages and valves needed to adjust a brake hydraulic pressure. The hydraulic pressure generator includes a motor that is connected to the hydraulic block and operates by an output signal of a detection sensor for sensing displacement of the brake pedal, thereby generating brake hydraulic pressure. The ECU controls the motor and the valves based on pressure information and pedal displacement information. The installation structure of the pedal stroke sensor includes a magnet installed in a piston that slidably moves within the master cylinder by interacting with the brake pedal. The detection sensor includes a first sensor and a second sensor that are spaced apart from each other by a predetermined distance in a movement direction of the piston in a manner that the first
(Continued)

and second sensors detect a magnetic flux density of the magnet in response to movement of the piston.

6 Claims, 4 Drawing Sheets

(51) Int. Cl.
*B60T 11/18* (2006.01)
*B60T 7/06* (2006.01)
*B60T 8/36* (2006.01)
*B60T 17/22* (2006.01)

(56) References Cited

U.S. PATENT DOCUMENTS

| | | | |
|---|---|---|---|
| 8,240,196 B2* | 8/2012 | Park | B60T 7/042 |
| | | | 73/121 |
| 8,978,457 B2* | 3/2015 | Naether | B60T 17/22 |
| | | | 73/129 |
| 8,985,714 B2* | 3/2015 | von Hayn | B60T 7/042 |
| | | | 303/113.3 |
| 9,383,279 B2* | 7/2016 | Sim | B60T 7/042 |
| 10,124,778 B1* | 11/2018 | Forwerck | B60T 8/171 |
| 10,207,690 B2* | 2/2019 | Nakazawa | B60T 8/368 |
| 2002/0117893 A1* | 8/2002 | Shaw | B60T 8/3255 |
| | | | 303/113.4 |
| 2003/0000375 A1* | 1/2003 | Zumberge | F02B 77/08 |
| | | | 92/5 R |
| 2011/0113874 A1* | 5/2011 | Park | G01B 7/30 |
| | | | 73/121 |
| 2013/0205881 A1* | 8/2013 | Naether | B60T 11/16 |
| | | | 73/121 |

FOREIGN PATENT DOCUMENTS

| | | |
|---|---|---|
| KR | 10-2013-0071904 | 7/2013 |
| KR | 10-2016-0082036 | 7/2016 |

\* cited by examiner

INSTALLATION STRUCTURE OF PEDAL STROKE SENSOR

CROSS-REFERENCE TO RELATED APPLICATION

This application is based on and claims priority under 35 U.S.C. § 119 to Korean Patent Application No. 10-2017-0135571, filed on Oct. 19, 2017 in the Korean Intellectual Property Office, the disclosure of which is incorporated by reference in its entirety.

BACKGROUND

1. Field

Embodiments of the present disclosure relate to an installation structure of a pedal stroke sensor simulator, and more particularly to an installation structure of a pedal stroke sensor designed to determine an absolute position based on movement of a brake pedal.

2. Description of the Related Art

Generally, a vehicle may include a machine that always detects a pivotable angle of a pedal arm of either a brake pedal or an accelerator pedal such that the machine can be precisely controlled according to the detected pivotable angle.

For example, the vehicle may detect how much the pedal arm of the brake pedal was pivotably moved using a pedal stroke sensor, such that the vehicle can electrically control the machine based on the detected result. Representative examples of the pedal stroke sensor have been disclosed in Korean Patent Laid-Open Publication Nos. 10-2011-0053777 and 10-2013-0071904. The conventional pedal stroke sensor disclosed in the above-mentioned representative examples has been designed to detect an angle of either a brake pedal or a clutch pedal. In addition, the conventional pedal stroke sensor may be provided in the vicinity of a hinge shaft through which a pedal arm can pivotably move, and may measure the degree of movement of the brake pedal according to a change in output value dependent upon a pivotable angle of the brake pedal.

The above-mentioned conventional pedal stroke sensor may be linked to an Integrated Dynamic Brake (IDB) system corresponding to one example of electronic (or electric) brake systems, such that the conventional pedal stroke sensor can interact with the IDB system as necessary. For example, the IDB system may receive an electric signal indicating an operation corresponding to displacement of a pedal through the pedal stroke sensor, such that the IDB system may properly control the brake system using the received electric signal.

However, the above-mentioned conventional pedal stroke sensor designed to detect the angle of the brake pedal or the clutch pedal is directly mounted to each pedal separately from the IDB system, such that the conventional pedal stroke sensor must additionally include various constituent elements, for example, a cover, a printed circuit board (PCB), a sensing unit, a housing including the cover, the PCB, and the sensing unit, and a connector to be connected to an Electronic Control Unit (ECU) including a main PCB. As a result, the conventional pedal stroke sensor has difficulty in constructing a packaged system structure.

In addition, the conventional pedal stroke sensor is unable to measure displacement of the pedal during malfunction or destruction of the sensing unit, such that there is a higher possibility of unexpected accidents, resulting in reduction in product reliability.

CITED REFERENCES (Patent Document 1)
Korean Patent Laid-Open Publication No. 10-2011-0053777 (see FIGS. 1 to 5) (published on 24 May 2011, HYUNDAI Motor Company and KIA Motor Corporation)
(Patent Document 2)
Korean Patent Laid-Open Publication No. 10-2013-0071904 (see FIGS. 2 to 5) (published on 1 Jul. 2013, TRUWIN Co., Ltd.)

SUMMARY

Therefore, it is an aspect of the present disclosure to provide an installation structure of a pedal stroke sensor that is capable of determining an absolute position of a brake pedal, and is simplified in structure, such that the installation structure of the pedal stroke sensor can be easily packaged with an Integrated Dynamic Brake (IDB) system using the simplified structure.

Additional aspects of the invention will be set forth in part in the description which follows and, in part, will be obvious from the description, or may be learned by practice of the invention.

In accordance with an aspect of the present disclosure, an installation structure of a pedal stroke sensor of an integrated dynamic brake (IDB) system is disclosed. The IDB system includes a hydraulic block, a hydraulic pressure generator, and an electronic control unit (ECU). The hydraulic block includes not only a master cylinder connected to a brake pedal but also a plurality of passages and valves needed to adjust a brake hydraulic pressure. The hydraulic pressure generator includes a motor that is connected to the hydraulic block and operates by an output signal of a detection sensor for sensing displacement of the brake pedal, thereby generating brake hydraulic pressure. The ECU controls the motor and the valves based on pressure information and pedal displacement information. The installation structure of the pedal stroke sensor includes a magnet installed in a piston that slidably moves within the master cylinder by interacting with the brake pedal. The detection sensor includes a first sensor and a second sensor that are spaced apart from each other by a predetermined distance in a movement direction of the piston in a manner that the first and second sensors detect a magnetic flux density of the magnet in response to movement of the piston.

The first sensor and the second sensor may be installed in a printed circuit board (PCB) provided in the ECU.

The first sensor and the second sensor may be implemented as a Hall Integrated Circuit (Hall IC) to detect a change in magnetic force.

The detection sensor may detect an absolute position of the piston based on a specific position where a first position detected by an output value of the first sensor and a second position detected by an output value of the second sensor overlap each other during movement of the piston.

When any one of the first sensor and the second sensor abnormally operates, the remaining one sensor other than the abnormal sensor may detect the magnetic flux density of the magnet in response to movement of the piston.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
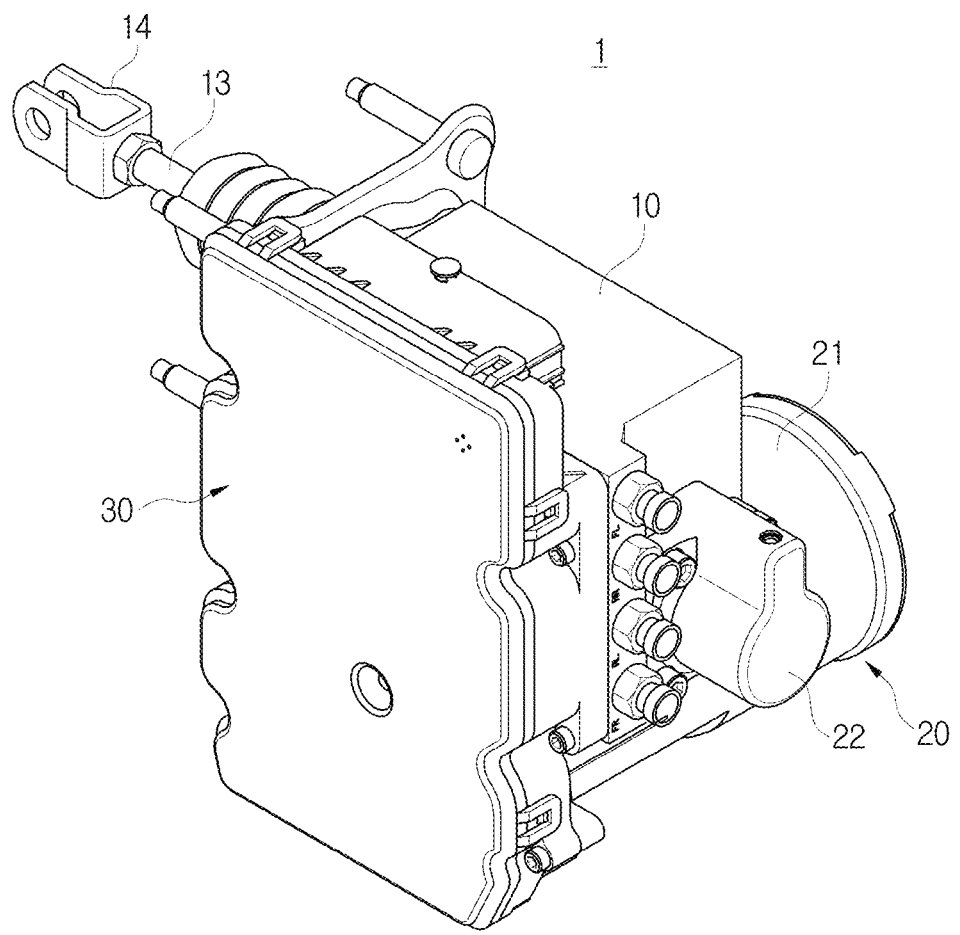
FIG. 1 is a perspective view illustrating an integrated dynamic brake (IDB) system provided with a pedal stroke sensor according to an embodiment of the present disclosure.

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

In accordance with one aspect of the present disclosure, a pedal stroke sensor may be installed to be easily packaged with an Integrated Dynamic Brake (IDB) system. Prior to describing the installation structure of the pedal stroke sensor, the IDB system to be packaged with the pedal stroke sensor will hereinafter be described with reference to FIGS. 1 and 2.

Figure 2:
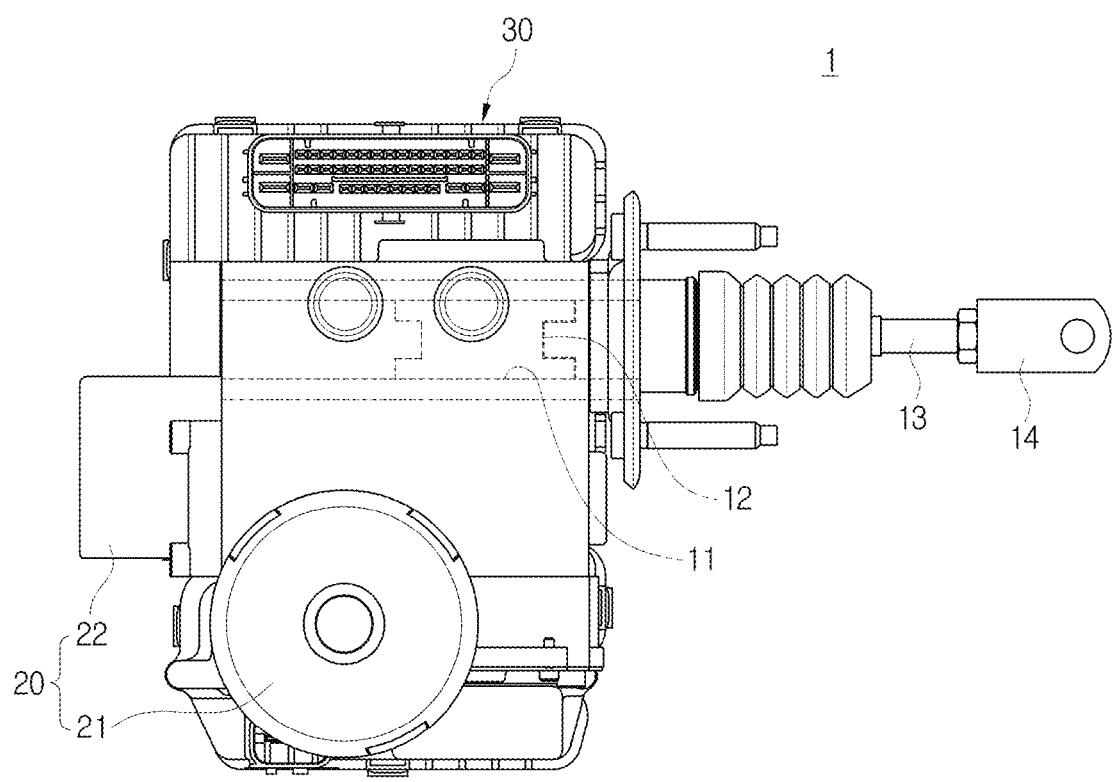
FIG. 2 is a side view illustrating an IDB system provided with a pedal stroke sensor according to an embodiment of the present disclosure.

FIG. 1 is a perspective view illustrating the IDB system provided with the pedal stroke sensor according to an embodiment of the present disclosure. FIG. 2 is a side view illustrating the IDB system provided with the pedal stroke sensor according to an embodiment of the present disclosure.

Referring to FIGS. 1 and 2, the IDB system may include a hydraulic block 10, a hydraulic pressure generator 20, and an electronic control unit (ECU) 30. The hydraulic block 10 may include a plurality of passages and valves to adjust a brake hydraulic pressure therein. The hydraulic pressure generator 20 may receive an electric signal indicating the driver's braking intention from the pedal stroke sensor, and may mechanically operate by the received electric signal. The ECU 30 may control the IDB system based on pressure information and pedal displacement information.

The hydraulic block 10 may be formed in a hexahedral shape, and may transmit brake hydraulic pressure to wheel cylinders (not shown) respectively provided to wheels. That is, the hydraulic block 10 may include passages to control a brake hydraulic pressure to be transferred to wheel cylinders, and may include a plurality of valves installed at proper positions. In addition, the hydraulic block 10 may further include a master cylinder 11. The master cylinder 11 may include at least one piston 12 and at least one chamber to generate hydraulic pressure. The at least one piston 12 may be connected to a brake pedal, and may be pressurized in response to a pedal effort applied to the brake pedal. That is, the master cylinder 11 may include a clevis 14 coupled to the brake pedal and an input shaft 13 coupled to the clevis 14, and may allow a piston 12 to be pressed in response to a pedal effort applied to the brake pedal, resulting in formation of hydraulic pressure. The above-mentioned master cylinder 11 is well known to those skilled in the art, and as such a detailed description thereof will herein be omitted. Although not shown in the drawings, a reservoir to store oil therein may be coupled to an upper part of the hydraulic block 10 in which the master cylinder 11 is provided, such that hydraulic pressure can be applied to the master cylinder 11.

The hydraulic pressure generator 20 may include a motor 21 coupled to a side surface of the hydraulic block 10, a power switching unit (not shown) to convert rotational force into rectilinear movement, and a slave cylinder 22 to be pressed by the power switching unit.

The motor 21 may operate by an electric signal of the pedal stroke sensor configured to detect a displacement corresponding to a pedal effort applied to the brake pedal. In other words, the motor 21 may rotate in forward and backward directions to generate rotational force such that a braking action can be carried out according to brake force desired by the driver.

The power switching unit may receive a plurality of gears configured to receive rotational force from a rotation shaft (not shown) of the motor 21 as well as to convert the rotational force into rectilinear movement. For example, the power switching unit may include a worm, a worm wheel, and/or a rack-and-pinion gear, such that the power switching unit may convert rotational force into rectilinear movement. The power switching unit to convert rotational force into rectilinear movement is well known to those skilled in the art, and as such a detailed description thereof will herein be omitted.

The slave cylinder 22 may be installed in the hydraulic block 10 separately from the master cylinder 11, and may include a slave piston, a hydraulic chamber, and a return spring. The slave piston may reciprocate by the power switching unit, and may generate brake hydraulic pressure. The hydraulic chamber may be pressed by the slave piston. The return spring may elastically support the slave piston. In this case, some parts of the slave piston may include rack gears such that the slave piston can perform rectilinear movement through the power switching unit.

The ECU 30 may be coupled to a side surface of the hydraulic block 10, and may control the motor 21 and valves based on pressure information and pedal displacement information. The ECU 30 may include a PCB (see '31' of FIG. 3) provided with various constituent elements, such that the ECU 30 may control the motor 21 and the valves using the PCB. In accordance with one aspect of the present disclosure, the detection sensors 210 and 220 to detect displacement of the pedal may be installed in the PCB 31 of the ECU 30, such that the detection sensors 210 and 220 need not use a separate PCB, resulting in implementation of a simplified structure and reduction in production costs.

A method and structure for installing the pedal stroke sensor in the above-mentioned IDB system 1 will hereinafter be described with reference to the attached drawings.

Figure 3:
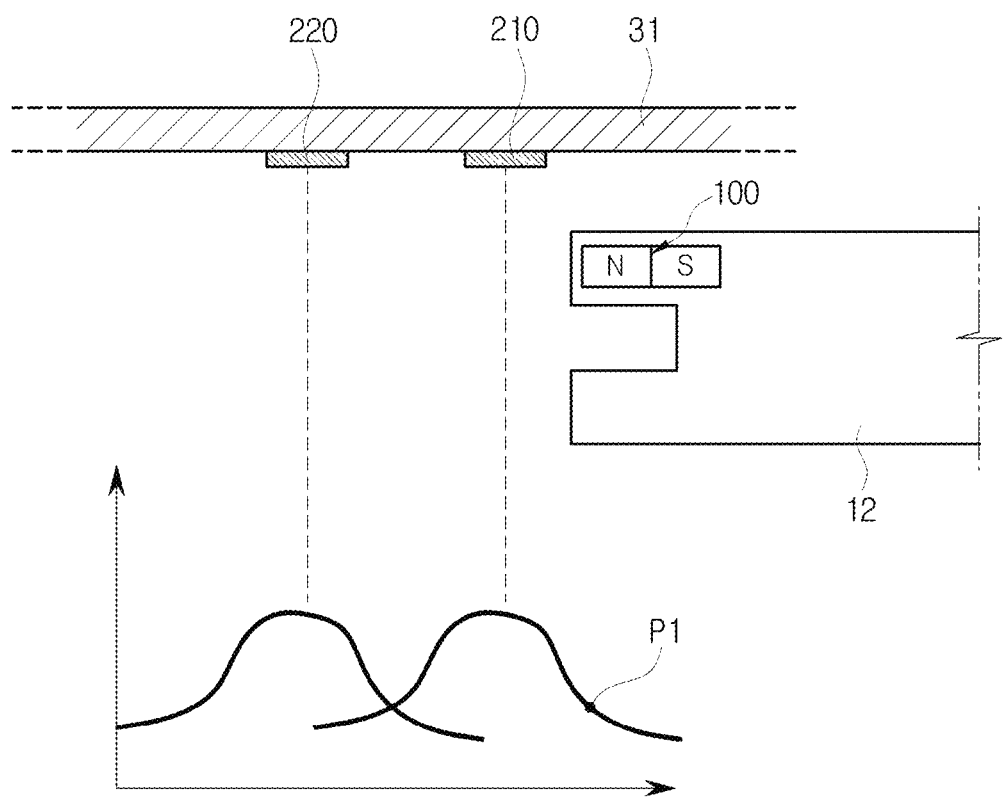
FIG. 3 is a view illustrating an installation structure of a pedal stroke sensor according to an embodiment of the present disclosure.

FIG. 3 is a view illustrating an installation structure of the pedal stroke sensor according to an embodiment of the present disclosure.

Referring to FIG. 3, the installation structure of the pedal stroke sensor according to one aspect of the present disclosure may include a magnet 100 in the piston 12 of the master cylinder (see '11' of FIG. 2), and may include a plurality of detection sensors 210 and 220 to detect magnetic flux density of the magnet 100 in the PCB 31 of the ECU (see '30' of FIG. 2).

The magnet 100 may be installed in the piston 12, and may move along with the piston 12 according to a pedal effort applied to the brake pedal. This magnet 100 may be installed to face the detection sensors 210 and 220, and may be formed in a ring shape, such that the ring-shaped magnet 100 may be installed in the piston 12.

The detection sensors 210 and 220 may be installed in the PCB 31 of the ECU 30. In other words, the installation structure of the pedal stroke sensor according to one aspect of the present disclosure does not include a separate PCB that has been used to accommodate typical sensors in the related art, and the detection sensors 210 and 220 may be installed in the PCB 31 of the ECU 30 requisite for the IDB system 1, such that the installation structure of the pedal stroke sensor can be simplified in structure and can also be easily packaged with others. The detection sensors 210 and 220 may be implemented as a Hall integrated circuit (Hall IC). The Hall IC may be installed in the PCB 31, and may detect the degree of change in magnetic force. More specifically, the detection sensors 210 and 220 may include a first sensor 210 and a second sensor 220. The first sensor 210 and the second sensor 220 may be spaced apart from each other by a predetermined distance in a movement direction of the piston 12 such that each of the first sensor 210 and the second sensor 220 may detect magnetic flux density of the magnet 100 in response to movement of the piston 12.

Figure 4:
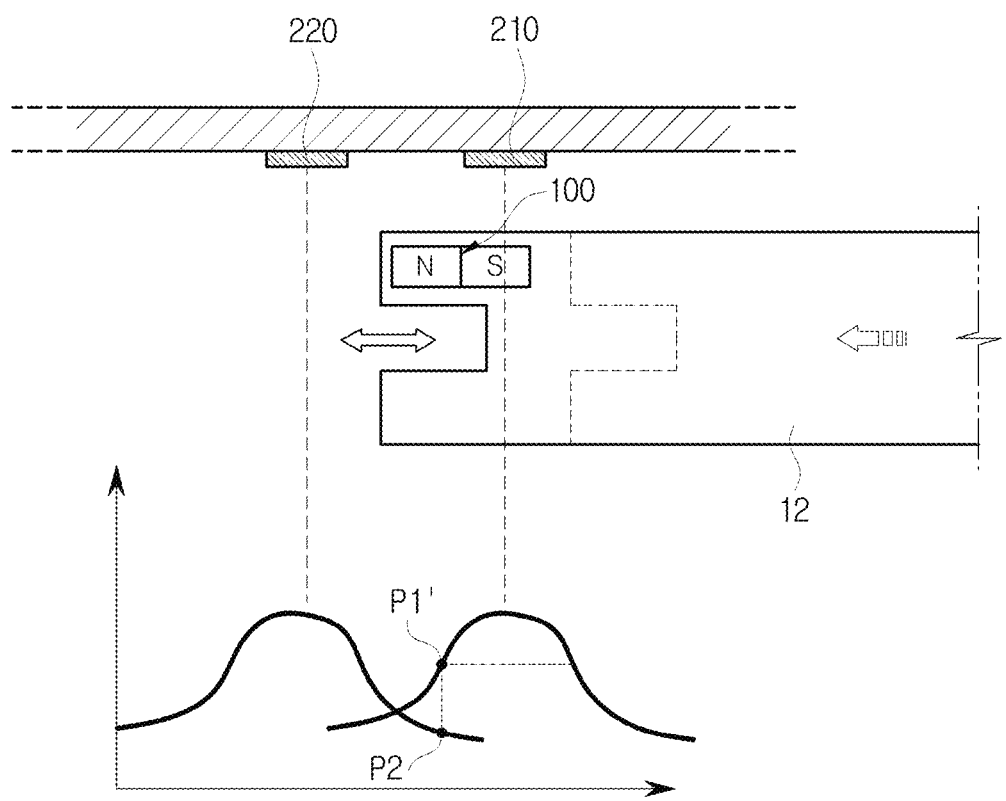
FIG. 4 is a view illustrating a method for determining an absolute position of a piston according to a pedal effort of the brake pedal using the installation structure of the pedal stroke sensor according to an embodiment of the present disclosure.

When the first sensor 210 and the second sensor 220 are spaced apart from each other by the predetermined distance, it is necessary for a first output value detected by the first sensor 210 to partially overlap with a second output value detected by the second sensor 220. In more detail, as shown in FIG. 4, when the piston 12 moves in response to a pedal effort applied to the brake pedal, the first sensor 210 and the second sensor 220 may detect magnetic flux density of the magnet 100 mounted to the piston 12, such that it may be possible to determine an absolute position of the piston 12 (i.e., an absolute position of the magnet 100) based on an overlap position of the output values of the first and second sensors 210 and 220. In more detail, as can be seen from FIGS. 3 and 4, under the condition that no pedal effort is applied to the brake pedal, it may be possible to recognize the presence of the piston 12 that is located at a part 'P1' detected by the output value of the first sensor 210. In this case, when the piston 12 moves in response to a pedal effort applied to the brake pedal, the piston 12 detected by the output value of the first sensor 210 may move from one part P1 to another part P1'. Simultaneously, it may also be possible to detect the presence of the piston 12 located at the part P2 of the output value of the second sensor 220. That is, the part P1' detected by the first sensor 210 may overlap with the other part P2 detected by the second sensor 220, such that the sensors 210 and 220 can determine an absolute position of the piston 12. Accordingly, through the installation structure of the pedal stroke sensor according to one aspect of the present disclosure, it may be possible to precisely measure a displacement of the brake pedal in response to movement of the piston 12.

Meanwhile, the installation structure of the pedal stroke sensor according to one aspect of the present disclosure may include two sensors, i.e., the first sensor 210 and the second sensor 220. Accordingly, although any one of the first sensor 210 and the second sensor 220 is broken or malfunctions, the pedal stroke sensor can stably measure displacement of the brake pedal using the remaining one sensor. As a result, redundancy for autonomous driving and cruise control can be guaranteed.

As is apparent from the above description, the installation structure of the pedal stroke sensor according to the embodiments of the present disclosure may include a magnet and at least one sensor not only in a printed circuit board (PCB) of an electronic control unit (ECU), but also in a piston of a master cylinder provided in the IDB system. As a result, the installation structure of the pedal stroke sensor according to the present disclosure need not include not only a conventional PCB provided with a separate sensor fabricated to sense displacement of a pedal, but also a cover, a housing, a connector, etc., such that the pedal stroke sensor can be simplified in structure and can also be easily packaged with the IDB system.

The installation structure of the pedal stroke sensor according to the embodiments of the present disclosure may include two sensors spaced apart from each other by a predetermined distance, may determine an absolute position of a brake pedal according to movement of the brake pedal, and may measure displacement of the brake pedal irrespective of malfunction or destruction of any one of the two sensors, resulting in increased product reliability.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An installation structure of a pedal stroke sensor of an integrated dynamic brake (IDB) system which includes a hydraulic block, a hydraulic pressure generator, and an electronic control unit (ECU), wherein the hydraulic block includes a master cylinder connected to a brake pedal and a plurality of passages and valves needed to adjust a brake hydraulic pressure, the hydraulic pressure generator includes a motor that is connected to the hydraulic block and operates by an output signal of a detection sensor for sensing displacement of the brake pedal, thereby generating brake hydraulic pressure, and the electronic control unit (ECU) controls the motor and the valves based on pressure information and pedal displacement information, the installation structure comprising:

a magnet installed in a piston that slidably moves within the master cylinder by interacting with the brake pedal, wherein the detection sensor includes a first sensor and a second sensor that are spaced apart from each other by a predetermined distance in a movement direction of the piston in a manner that the first and second sensors detect a magnetic flux density of the magnet in response to movement of the piston and a first part detected by the first sensor and a second part detected by the second sensor at least partially overlap each other.

2. The installation structure of the pedal stroke sensor according to claim 1, wherein the first sensor and the second sensor are installed in a printed circuit board (PCB) provided in the electronic control unit (ECU).

3. The installation structure of the pedal stroke sensor according to claim 1, wherein the first sensor and the second sensor are implemented as a Hall Integrated Circuit (Hall IC) to detect a change in magnetic force.

4. The installation structure of the pedal stroke sensor according to claim 1, wherein the detection sensor is configured to detect an absolute position of the piston based on a specific position where a first position detected by an output value of the first sensor and a second position detected by an output value of the second sensor overlap each other during movement of the piston.

5. The installation structure of the pedal stroke sensor according to claim 1, wherein:
   when any one of the first sensor and the second sensor abnormally operates, any one of the first sensor and the second sensor which does not abnormally operate is configured to detect the magnetic flux density of the magnet in response to movement of the piston.

6. The installation structure of the pedal stroke sensor according to claim 1, wherein the detection sensor is configured to detect an absolute position of the piston based on an overlapped part of the first part detected by the first sensor and the second part detected by the second sensor.

* * * * *